Patented Dec. 7, 1943

2,335,962

UNITED STATES PATENT OFFICE 2,335,962

POLYMERIZED MIXED ESTER AND METHOD OF MANUFACTURE THEREOF

Maxwell A. Pollack, Akron, and Albert G. Chenicek, Barberton, Ohio, assignor to Pittsburgh Plate Glass Company, Allegheny County, Pa., a corporation of Pennsylvania No Drawing. Application August 10, 1939, Serial No. 289,448

6 Claims. (Cl. 260—84)

This invention relates to the unsaturated esters of polymeric acrylic and alpha-substituted acrylic acids and to polymers thereof. In accordance with our invention, we have found that desirable products may be obtained by treatment of saturated polymers of acrylic and alpha-substituted acids or their esters or other derivatives to form unsaturated derivatives thereof. These derivatives may then be further polymerized to form hard, substantially infusible and insoluble polymers of high brilliancy and transparency.

The invention is particularly directed to the products which may be derived from the polymeric saturated esters of the above acids such as methyl, ethyl or propyl methacrylate, acrylate, or chloroacrylate polymers. It has been found that very desirable materials may be derived from these polymers by treatment with an unsaturated alcohol or derivative thereof, whereby an ester interchange occurs with all or a portion of the saturated ester groups. Of particular interest in this respect are the products which may be obtained using allyl alcohol. However, other unsaturated alcohols containing the group

such as methallyl, 2-chloroallyl, propargyl, 3-butenyl, or allyl ethyl alcohol may be used in a similar manner. Unsaturated alcohols other than allyl type alcohols such as crotyl and oleyl alcohols may be used to produce compounds having somewhat lower tendencies to polymerize. In addition, polyacrylic acids or other derivatives thereof such as the acid chlorides, amides, imides or nitriles thereof may be esterified in this manner. Thus, polyacrylyl chloride, polymethacrylyl chloride, polymethacrylic acid, polyacrylic acid, polymethacrylamide, polyacrylamide, polymethacrylonitrile, etc. may be esterified to form the desired product. In many cases, it is not desired to secure a product which is completely esterified by the unsaturated alcohol and for many purposes a mixed ester containing both saturated and unsaturated linkages may be obtained.

The products thus obtained may be polymerized in the presence or absence of heat, light and/or catalysts to form hard, infusible, transparent products which are not appreciably affected by the action of solvents. By regulation of the degree of polymerization of the agent undergoing treatment, it is possible to produce products having a wide range of characteristics. Thus, by treating acrylic polymers of high molecular weight, flexible durable articles may be obtained while by treating polymers which are somewhat lower in molecular weight, harder, more brittle products may be secured. It is also possible to control the properties of final polymer very accurately by regulating the degree of ester interchange which occurs, whereby a controlled amount of unsaturated groups are introduced into the polymer undergoing treatment. Thus, if hard brittle products are desired, the number of allyl groups will be preferably high while if the softer, more flexible products are desired, the amount of unsaturated groups is decreased. In any case it is generally preferred to introduce at least 30 percent of the theoretical amount of allyl or unsaturated ester groups which may be introduced.

In general, the esterification may be conducted by heating the saturated polyacrylate or alpha-substituted polyacrylate in the presence of the desired alcohol with or without catalysts such as sulphuric acid, p-toluenesulphonic acid or alkali metal compounds such as sodium methoxide, etc. If necessary inhibitors such as hydroquinone sulfur, copper compounds, phenylene diamine, etc., may be introduced to prevent polymerization of the material during treatment. If desired, suitable inert diluents or solvents may be incorporated to promote reaction. The unsaturated esters after preparation may be recovered by distillation of the solvent or diluent and excess alcohol if desired, or they may be obtained by precipitation methods through use of a nonsolvent such as water, methyl or ethyl alcohol, etc.

The unsaturated polymeric esters so produced have many characteristics which are similar to those of the thermoplastic vinylic polymers such as the polymers of the saturated acrylic acid esters. They are soluble in such organic solvents as acetone, dioxane, chloroform, ethyl cellosolve acetate, triacetin, phenyl cellosolve acetate, toluene, xylene, benzene, etc., and soften upon heating. All of these products may be molded into convenient shapes.

In accordance with our invention, we have found that upon subjection of these polymers to heating at temperatures near the softening point thereof, for example 60–125° C., for a sufficient period of time, they are converted into substantially infusible, insoluble, transparent, hard and wear-resistant product. This conversion appears to occur in the absence of catalysts and in some cases, heat is unnecessary. The polymerization may be assisted, however, by the use of usual polymerization catalysts, such as oxygen, ozone, air, peroxides, such as hydrogen peroxide, benzoyl peroxide or basic or acidic catalysts, light, etc. When catalysts are used, it is found that the conversion of these products to the infusible state occurs more rapidly and may be secured at somewhat lower temperatures than is the case when catalysts are not used. The application of super-atmospheric pressure also has been found to assist the transformation to the insoluble and infusible state.

The following examples are illustrative:

Example I 500 parts by weight of a 40 percent solution of methyl acrylate polymer in toluene was mixed with 270 parts by weight of allyl alcohol, 15.4 parts by weight of para toluenesulphonic acid and 3.4 parts by weight of hydroquinone. The mixture was heated at 70–80° C. for 8 hours and distilled. At intervals during the distillation 116 parts by weight of allyl alcohol were added. After the mixture had been distilled for 18 hours the undistilled liquid was poured into a quantity of methanol to precipitate a white acetone soluble thermoplastic polymer. The amount of ester interchange was 44 percent of the theoretical. Upon heating this product to a temperature of 100° C. in the presence of 2 percent benzoyl peroxide the product was converted into a hard, transparent mass.

Example II

A solution of 150 g. of methyl methacrylate polymer in 500 cc. of toluene containing 2.5 g. of hydroquinone was heated with 174 g. of allyl alcohol for 16 hours at 130° C. At this temperature a mixture of toluene and methyl alcohol slowly distilled. During the reaction there was added as a catalyst 100 cc. of a 10% solution of sodium in methyl alcohol. An additional 116 g. of allyl alcohol was also added during the reaction.

The reaction mixture was poured, with stirring, into 6 liters of a solution of 80% methyl alcohol and 20% water. The precipitate was separated, dissolved in acetone and reprecipitated by means of the methanol-water solution. The dried product was a white powder which was acetone soluble and was found to have 10% of the methyl groups replaced by allyl groups. Upon heating to 125° C. for one hour the product converted to a thermosetting, hard, flexible mass.

The process herein described may be extended to the production of mixed polymers, if desired. Thus, the fusible polymer prepared in accordance with my invention may be mixed with other polymers such as polymers of methyl methacrylate, methyl chloroacrylate, vinyl acetate, vinyl chloride, styrene, etc., or with the monomeric acrylate, chloroacrylate, vinyl chloride, etc., and the mixture subjected to conditions of polymerization.

Example III 72 g. of polyacrylic acid was heated with 80 g. of allyl alcohol in the presence of one percent of p-toluenesulphonic acid until esterification was substantially complete. The product was easily fusible and soluble in most common organic solvents, forming clear films upon evaporation of solutions thereof. Upon heating to 140° C. for a few minutes, conversion to the insoluble and infusible form occurred.

Other ways of preparing convertible resins from non-convertible acrylate polymers besides those mentioned above include condensation of polymethacrylamide with acrolein or crotonaldehyde, anhydride formation between polymethacrylic acid and maleic or crotonic acids, and the like.

By operation in accordance with the present invention, it is possible to form a molded article from the fusible polymer such as the fusible allyl or methallyl polyacrylates referred to, and thereafter to render the molded article insoluble and infusible by heat. In this manner, we are able to prepare transparent, hard, infusible, molded products which have many of the desirable properties of the conventionally known thermoplastic resins. Extrusion molding processes may be resorted to for this purpose and it is found that the temperature and pressure within the extrusion die and the catalyst concentration of the polymer may be controlled so that the polymer becomes infusible as it leaves the extrusion die or a short time thereafter. This method of molding is of particular importance since it permits the formation of fracture-free products. Thus, while attempts to cast polymerize allyl methacrylate generally result in the formation of a fractured product it is possible to avoid fractures by operation in accordance with the present invention.

A large number of inert substances may be incorporated with the fusible polymer before subjecting the molding condition. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dyestuffs such as methylene blue, methyl orange, etc.

The unsaturated polymeric acrylates are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article exposed to light to render the surface infusible. In this manner, it is possible to surface other polymers which are less resistant to the action of solvents or of heat. When a coating of the fusible allyl polyacrylate or similar ester is deposited upon polymerized methyl methacrylate or similar polymer and the solvent removed, a coherent surface thereof is formed. Upon heating the coated article to suitable temperature, this surface may be made transparent, hard and infusible.

Being of the thermosetting type, these resins do not exhibit the phenomenon of "cold flow" and are thus especially suited to the production of accurately machined or molded articles where retention of original dimensions is important. Coatings may also be applied to metal, glass, wood, synthetic resins, etc., surfaces by extrusion of the heated fusible polymer directly on the suitably prepared surface. In similar manner, the surface may be heated and the polymer applied in powdered form, whereupon fusion occurs first to give a smooth, homogeneous film which may then be heat-hardened.

Although the present invention has been described with reference to the specific details of certain embodiments thereof, it is not intended that such details shall be regarded as limitations upon the scope of the invention except insofar as included in the accompanying claims. In the claims the term "an acrylic acid" is intended to be generic to both acrylic and the alpha substituted acrylic acids such as methacrylic and alpha chloroacrylic acids.

We claim:

1. A hard, infusible, insoluble polymer of a mixed ester of a polymeric acrylic acid, selected from the group consisting of acrylic acid, methacrylic acid and chloracrylic acid, a saturated aliphatic monohydric alcohol and an aliphatic, monounsaturated, monohydric alcohol containing up to five carbon atoms.

2. A hard, infusible, insoluble polymer of a mixed ester of polymeric acrylic acid, a saturated aliphatic monohydric alcohol and allyl alcohol.

3. A hard, infusible, insoluble polymer of a mixed ester of polymeric methacrylic acid, a saturated aliphatic monohydric alcohol and allyl alcohol.

4. A method of preparing an insoluble, infusible resinous material from a polymerized ester of (a) a saturated aliphatic monohydric alcohol and (b) an acrylic acid selected from the group consisting of acrylic acid, methacrylic acid and chloracrylic acid, which comprises heating the polymerized ester in the presence of a lower aliphatic, monounsaturated, monohydric alcohol until at least a portion of the saturated alcohol groups of the ester are replaced by unsaturated alcohol groups, separating the resulting mixed ester, and finally heating the mixed ester to effect polymerization thereof through interlinkages involving the unsaturated alcohol groups.

5. A method of preparing an insoluble infusible resinous material from polymerized methyl acrylate, which comprises heating the polymeric ester in the presence of a lower aliphatic, monounsaturated, monohydric alcohol until about 30 percent of the methyl groups of the ester are replaced by unsaturated alcohol groups, separating the resulting mixed ester, and finally heating the mixed ester to effect polymerization thereof through interlinkages involving the unsaturated alcohol groups.

6. The method of claim 5, wherein the unsaturated alcohol is allyl alcohol.

MAXWELL A. POLLACK.
ALBERT G. CHENICEK.